United States Patent
Jones et al.

(10) Patent No.: US 9,009,257 B2
(45) Date of Patent: *Apr. 14, 2015

(54) DIRECT RETURN TO SOURCE (DRS) ROUTING OF CUSTOMER INFORMATION CONTROL SYSTEMS (CICS) TRANSACTIONS

(75) Inventors: Robert C. Jones, Winchester (GB); Andrew N. Smithson, Eastleigh (GB); Russell Wilson, Uffculme (GB)

(73) Assignee: International Business Machines Corporation, Armonk, NY (US)

( * ) Notice: Subject to any disclaimer, the term of this patent is extended or adjusted under 35 U.S.C. 154(b) by 590 days.

This patent is subject to a terminal disclaimer.

(21) Appl. No.: 13/356,569

(22) Filed: Jan. 23, 2012

(65) Prior Publication Data

US 2013/0191496 A1    Jul. 25, 2013

(51) Int. Cl.
*G06F 15/16* (2006.01)
*G06F 9/50* (2006.01)
*H04L 12/911* (2013.01)
*H04L 12/70* (2013.01)

(52) U.S. Cl.
CPC ............. *H04L 47/70* (2013.01); *G06F 9/5005* (2013.01)

(58) Field of Classification Search
CPC ............ H04L 47/70; G06F 2209/5013; G06F 9/5027

USPC ................. 709/217–219, 226–229, 238, 242; 718/104, 105
See application file for complete search history.

(56) References Cited

U.S. PATENT DOCUMENTS

| 6,154,770 | A | * | 11/2000 | Kostakos | 709/217 |
| 6,442,568 | B1 | * | 8/2002 | Velasco et al. | 1/1 |
| 8,056,085 | B2 | * | 11/2011 | Kelly et al. | 718/105 |
| 8,578,017 | B2 | * | 11/2013 | Cobb et al. | 709/224 |
| 2004/0034719 | A1 | * | 2/2004 | Peterson et al. | 709/250 |
| 2004/0194090 | A1 | * | 9/2004 | Kelly et al. | 718/100 |
| 2007/0263541 | A1 | * | 11/2007 | Cobb et al. | 370/235 |
| 2011/0072433 | A1 | * | 3/2011 | Laviolette | 718/102 |

* cited by examiner

*Primary Examiner* — Alina N Boutah
(74) *Attorney, Agent, or Firm* — Steven M. Greenberg, Esq.; CRGO Law

(57) ABSTRACT

A method, system, and computer programming product for returning a response directly to a transaction request originator in a customer information control system (CICS) is provided. The method can include receiving a transaction request in a CICS and allocating resources in the CICS in response to receiving the transaction request. The method additionally can include determining whether the CICS is an intended endpoint of the transaction request. Finally, the method can include extracting an address of an originator of the transaction request from the transaction request and sending a response to the originator at the extracted address upon determining that the CICS is the intended endpoint of the transaction request, but otherwise routing the transaction request to a different CICS along with the address within the transaction request.

11 Claims, 3 Drawing Sheets

US 9,009,257 B2

DIRECT RETURN TO SOURCE (DRS) ROUTING OF CUSTOMER INFORMATION CONTROL SYSTEMS (CICS) TRANSACTIONS

BACKGROUND OF THE INVENTION

1. Field of the Invention

The present invention relates to mainframe computer systems and more particularly to CICS transaction routine on mainframe computing systems.

2. Description of the Related Art

CICS is an acronym referring a transaction server that executes primarily in a mainframe computing system environment. CICS is designed for rapid, high-volume processing of computing transactions. The computing transactions can be included as part of a transaction oriented application, which in turn can be developed using a variety of programming languages. The programming languages, in turn, can use CICS-supplied language extensions to interact with CICS resources such as files, database connections, or to invoke functions such as web services.

Generally, a CICS transaction is a set of operations that perform a task together. Usually, the majority of transactions are relatively simple tasks such as requesting an inventory list or entering a debit or credit to an account. Remarkably, CICS supports thousands of transactions per second. Of note, usually CICS refers not only to a CICS Transaction Server, but also to a portfolio of transaction servers, connectors, referred to as CICS transaction gateways, and a number of supporting CICS tools.

In a typical mainframe computing environment, a CICS installation includes one or more regions, each generally referred to as a CICS region, spread across one or more operating system images. Within the mainframe computing environment, CICS transactions are routed from one CICS region to another, quite often with one routing region in the first instance leading to an Application Owning Region (AOR) or Terminal Owning Region (TOR). The CICS transactions can in turn feed to other CICS systems in a continuous chain.

Whenever a CICS transaction is routed from one region to another, resources remain allocated on the routed-from region despite the request being handled within a different, routed-to region. Thus, resources can be wasted within the routed-from region. To the extent, then, that a typical CICS installation consists of a number of distinct applications, each application having its own TOR and one or more AORs, and given the number transactions processing each second, the waste can be substantial.

BRIEF SUMMARY OF THE INVENTION

Embodiments of the present invention address deficiencies of the art in respect to routing CICS transactions and provide a novel and non-obvious method, system, and computer program product for returning a response directly to a transaction request originator in a CICS. In an embodiment of the invention, a method for returning a response directly to a transaction request originator in a CICS has been provided. The method can include receiving a transaction request in a CICS and allocating resources in the CICS in response to receiving the transaction request. The method additionally can include determining whether the CICS is an intended endpoint of the transaction request. Finally, the method can include extracting an address of an originator of the transaction request from the transaction request and sending a response to the originator at the extracted address upon determining that the CICS is the intended endpoint of the transaction request, but otherwise routing the transaction request to a different CICS along with the address within the transaction request.

In another embodiment of the invention, a CICS transaction routing system can be provided. The system can include a mainframe with at least one processor and memory and at least one CICS executing on the mainframe. The CICS in turn can include at least one transaction server and at least one connector. A transaction request originator can execute on the mainframe and a direct return to source (DRS) routing module can be coupled to the CICS. The module can include program code enabled to allocate resources in the CICS in response to receiving a transaction request driven from a connector into the CICS, to determine whether the CICS is an intended endpoint of the transaction request, and to extract an address of an originator of the transaction request from the transaction request and to send a response to the originator at the extracted address upon determining that the CICS is the intended endpoint of the transaction request, but otherwise to route the transaction request to a different CICS along with the address within the transaction request.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for returning a response directly to a transaction request originator in a CICS transaction routing system. Upon receiving a CICS transaction request from a CICS transaction gateway and information, such as state information, a routed-to CICS can allocate resources for handling a requested transaction. The routed-to CICS can determine whether or not the routed-to CICS is the intended endpoint. Upon determining that the routed-to CICS is the intended endpoint, the routed-to CICS can use state information in the request to determine from where the transaction request originated and can provide a response directly to the requestor. However, if it is determined that the routed-to CICS is not the intended endpoint according to the request, the transaction request can be forwarded to another CICS. Notably, once the request has been forwarded to a routed-to CICS, the now routed-from CICS can release any allocated resources. Alternatively, the now routed-from CICS can keep allocated resources available until the now routed-from CICS is notified by the intended endpoint that the intended endpoint is handling the transaction request. At that point, the now routed-from CICS can release the resources. In either instance, any allocated resources in the now routed-from CICS need not waste as the resources do not remain allocated on the routed-from CICS.

Figure 1:
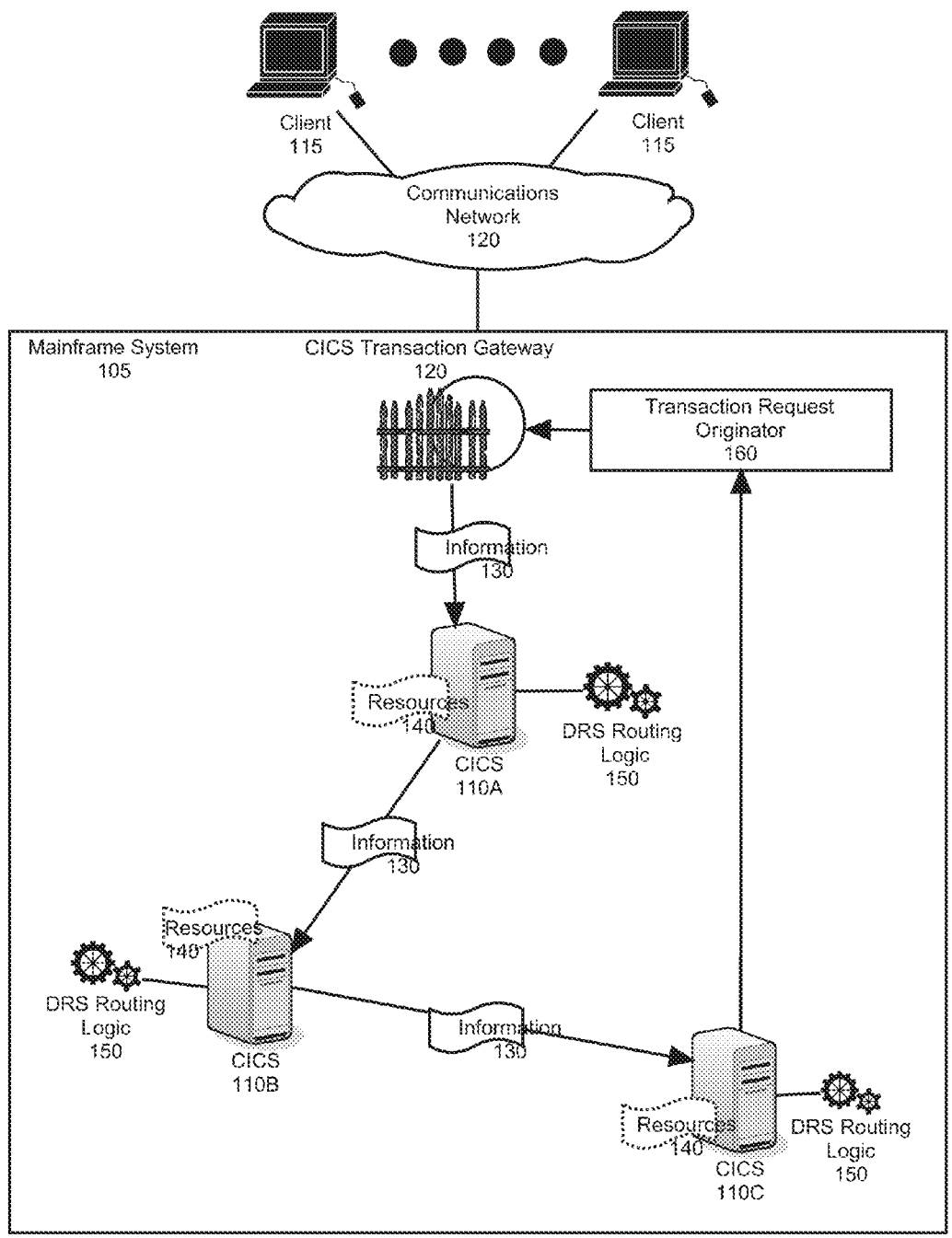
FIG. 1 is a pictorial illustration of a process for returning a response directly to a transaction request originator.

In further illustration, FIG. 1 pictorially shows a process for returning a response directly to a transaction request originator. As shown in FIG. 1, a client 115 connected to a mainframe system 105 via a communications network 120 can trigger a request originator 160 to generate a CICS transaction request. Of note, a connector, such as a CICS transaction gateway 120, can drive the transaction requests into CICS using a number of different protocols and application program interfaces (APIs), for instance IPIC. The different protocols and APIs can pass information 130, such as state information, which can be used to determine a request originator 160. For instance, the IPIC protocol has a concept of "OriginData," which provides sufficient state information to allow a CICS to determine where a request originated, for example, which transaction gateway daemon system may have originated a request. The information 130, including state information, can be included with a transaction request when a connection is made between the request originator 160, such as a transaction gateway daemon, and a CICS 110A. This CICS 110A can allocate resources 140 upon receiving the transaction request. In addition, direct return source (DRS) routing logic 150 can determine whether or not the CICS 110A is the intended endpoint of the transaction request. If DRS routing logic 150 determines that the CICS 110A is not the intended endpoint, then the transaction request is forwarded to another CICS 110B. Of note, if the second connection, between the initial CICS 110A and the next CICS 110B is made over IPIC, the "OriginData" is simply passed through from the routed-from CICS 110A to the routed-to CICS 110B.

In one instance, upon forwarding the information 130 to the next CICS 110B (the routed-to CICS), DRS routing logic 150 on the routed-from CICS 110A can release the allocated resources 140. Of note, the transaction request along with the information 130 can continue to be passed to another CICS, such as from CICS 110A to CICS 110B to CICS 110C, until DRS routing logic 150 determines that a CICS is the intended endpoint, for instance CICS 110C. Upon determining that a CICS 110C is the intended endpoint, DRS routing logic 150 can use the information 130 to determine where the transaction request originated from and provide a response directly to the request originator 160, such as to the original transaction gateway daemon. In another instance, DRS routing logic 150 may not release allocated resources 140 upon forwarding the transaction requested, but instead any intermediary CICS, such as CICS 110A, 110B, may not release the allocated resources 140 until the intended endpoint, such as CICS 110C, notifies intermediary CICS, such as CICS 110A, 110B, that the final endpoint CICS 110C will handle the request and the intermediary CICS 110A, 110B can release the allocated resources 140.

Figure 2:
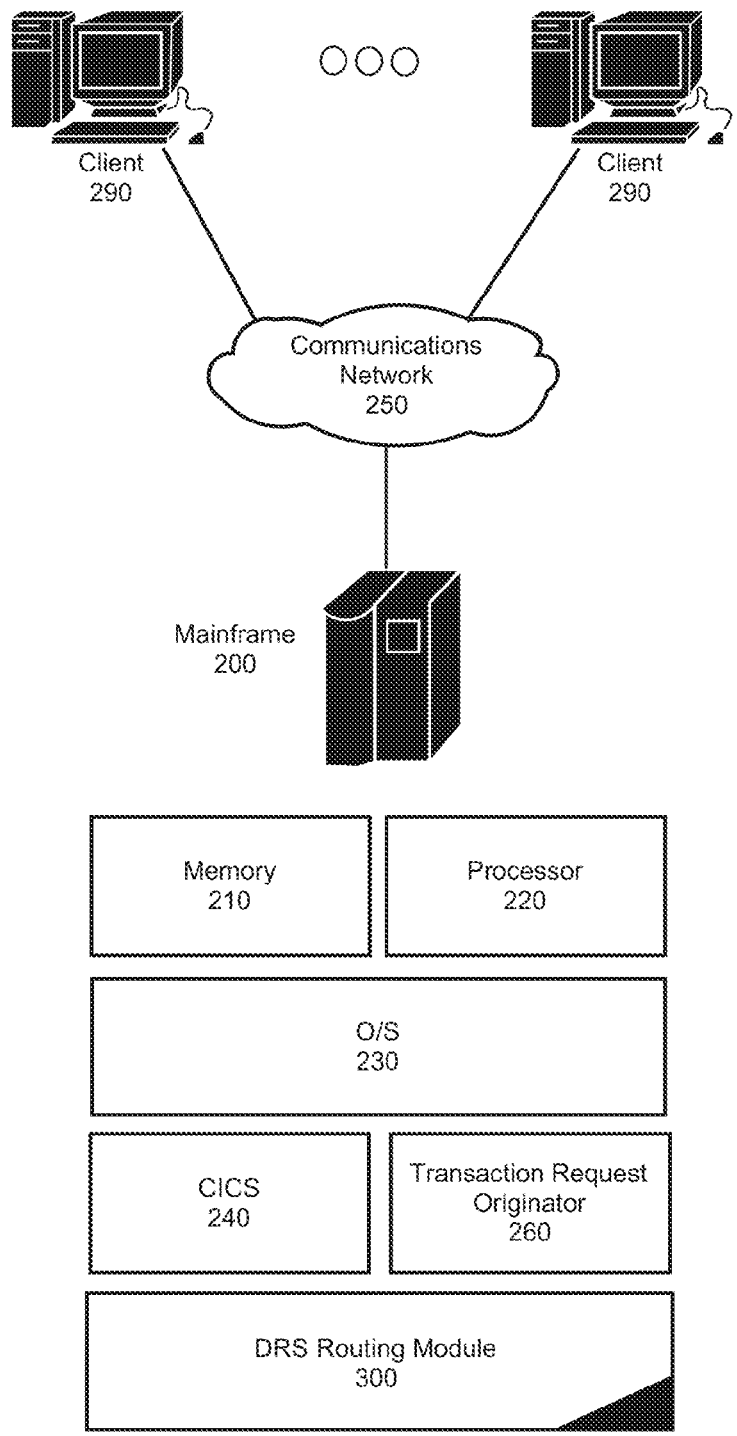
FIG. 2 is a schematic illustration of a CICS transaction routing system configured for returning responses directly to a transaction request originator; and, FIG. 3 is a flow chart illustrating a process for returning a response directly to a transaction request originator.

The process described in connection with FIG. 1 can be implemented in a CICS transaction routing system. In further illustration, FIG. 2 schematically shows a CICS transaction routing system configured for returning responses directly to a transaction request originator 260. The system can include clients 290 communicating via a communications network 280 to a mainframe 200. The communications network 280 is not limited to a specific communications protocol, but can include Internet, ethernet, wireless communications, 3G, and 4G. The mainframe 200 can include at least one processor 220 and memory 210 supporting the executing of an operating system (O/S) 230, for instance z/OS. The O/S 230 can in turn support at least one CICS 240, which can include a transaction server and at least one connector, for instance a transaction gateway, and a transaction request originator 260, such as a daemon. Of note, CICS 240 can include both routed-to CICSs and routed-from CICSs.

Of note, a DRS routing module 300 can execute in memory 210 of the mainframe 200 and can be coupled to at least one CICS 240. The DRS routing module 300 can include program code, which when executed can allocate resources in response to receiving a transaction request and state information in a routed-to CICS 240 from a transaction request originator. The DRS routing module 300 can further include program code to determine whether the routed-to CICS 240 is the intended endpoint of the transaction request and can send a response to the transaction request originator upon determining that the routed-to CICS 240 is the intended endpoint of the transaction request. For instance, for a connector in a CICS 240, such as a CICS transaction gateway that uses IPIC, a transaction request originator 260, for example, a transaction gateway daemon, can have a server-type implementation that can listen directly for returning requests as opposed to waiting for the transaction request to be returned on the connected socket. Optionally, the response can be returned to the original socket.

In addition, with IPIC, there may be a requirement for in-bound IPIC connections to be accepted. Also, as the endpoint CICS 240 (the final routed-to CICS) may not have an active IPIC connection to the transaction request originator 260, a connection may need to first be established between the final routed-to CICS 240 and the transaction requested originator 260 before the final routed-to CICS 240 can return a response to the transaction requested originator 260. If a connection is already established, the response can be returned over the existing connection.

Of note, in one instance, the DRS routing module 300 can further include program code to release allocated resources on a routed-from CICS 240 upon forwarding the transaction request to the routed-to CICS 240 upon determining that the routed-to CICS 240 is not the intended endpoint of the transaction request. In another instance, instead of releasing allocated resources associated with a particular transaction request upon forwarding the request to a different CICS 240 (the routed-to CICS), the routed-from CICS 240 can maintain the allocated resources and its connection. The routed-from CICS 240 (the intermediary CICSs, before the transaction request reaches its final endpoint CICS) may wait to release the allocated resources until receiving a reply from the final endpoint CICS 240 (the final routed-to CICS). The final routed-to CICS 240 may reply to the routed-from CICS 240 indicating that the final routed-to CICS 240 will handle the transaction request and the intermediary CICSs can release their resources. The final routed-to CICS 240 would communicate back a response to the transaction request originator 260.

Figure 3:
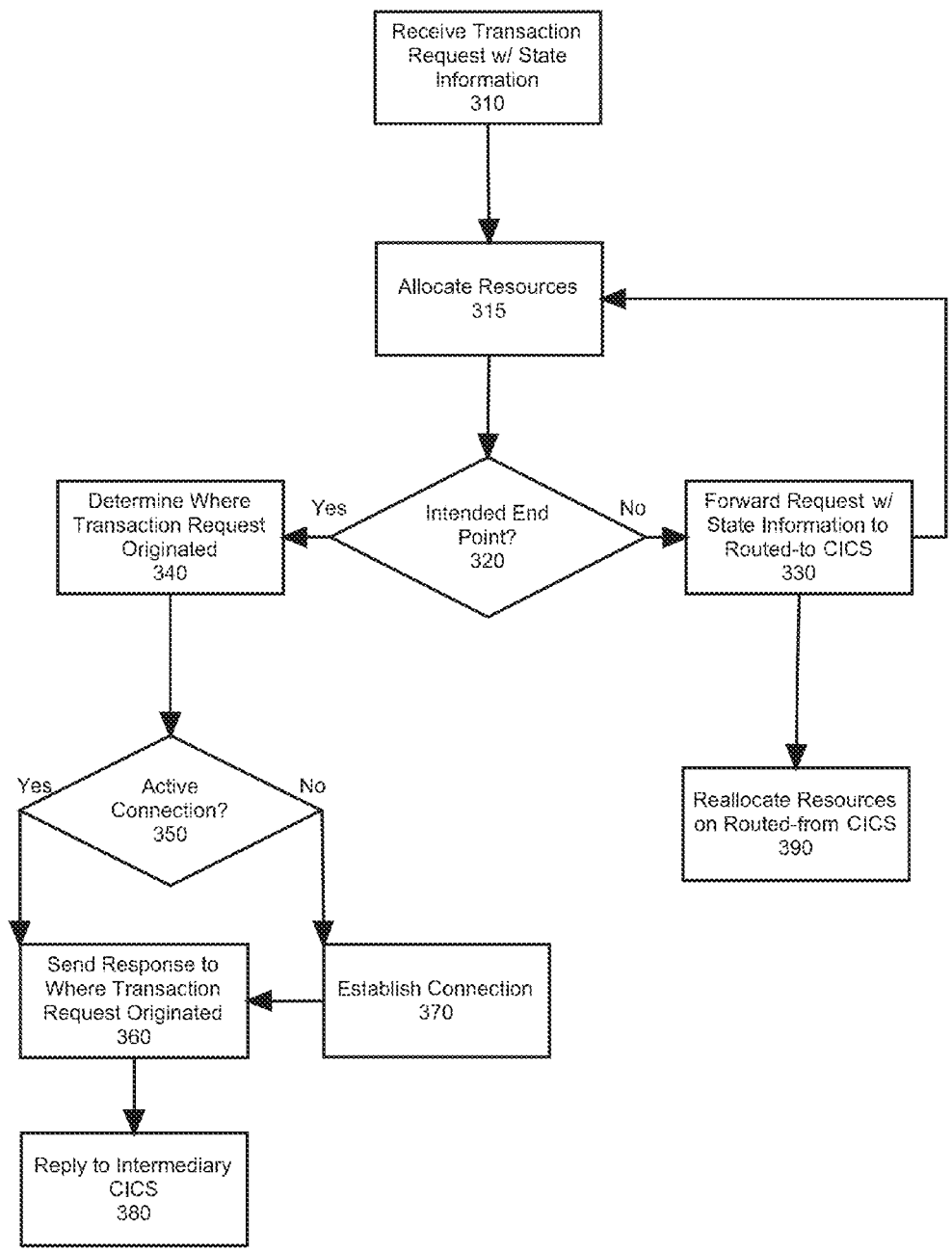

In even yet further illustration of the operation of the program code of the DRS routing module 300, FIG. 3 is a flow chart illustrating a process for returning a response directly to a transaction request originator. Beginning in step 310, a transaction request along with state information can be received into a CICS. Of note, the request can be driven into a CICS by a transaction gateway using a number of different protocols and APIs, for instance IPIC. The IPIC protocol uses the concept of OriginData, which can provide information, such as state information, that allows a CICS to determine where a transaction request originated, for example, which transaction gateway daemon originated the transaction request. The OriginData is included within a transaction request when a connection between a transaction gateway daemon and a CICS is made.

Upon receiving the request with the state information, the CICS (the routed-to CICS) allocated resources so it can handle the request, as shown in step 315. In step 320, the CICS then determines if it is the intended endpoint of the transaction request. If the CICS determines that it is not the intended endpoint, the transaction request is forwarded to a different CICS, as indicated in step 330. Upon forwarding the transaction request to a different CICS (a routed-to CICS), the now routed-from CICS, can optionally release allocated resources, as shown in step 390.

In step 340, where the transaction request originated using the state information, which can be part of the transaction request, can be determined in response to the routed-to CICS determining that it is the intended end point for the transaction request. Before the CICS can return a response to the transaction request originator, whether an active connection between the endpoint CICS and the transaction request originator needs to be determined, as shown in step 340. If the connection is not active already, an active connection is made, as in step 370, before a response to the transaction request originator is sent, as illustrator in step 360. If the connection is already active, a response to the transaction request can be sent to the transaction request originator, as in step 360. Optionally, as shown in step 380, an endpoint CICS (the final routed-to CICS), can reply back through the chain of intermediary CICSs (each routed-from CICS) indicating the endpoint CICS will handle the transaction request and informing each intermediary CICSs each can release allocated resources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A CICS transaction routing system comprising:
   a mainframe with at least one processor and memory;
   at least one CICS executing on the mainframe, the CICS can include at least one transaction server and at least one connector;
   a transaction request originator executing on the mainframe; and,
   a direct return to source (DRS) routing module coupled to the at least one CICS, the module comprising program code enabled to allocate resources in the CICS in response to receiving a transaction request driven from a connector into the CICS, to determine whether the CICS is an intended endpoint of the transaction request, and to extract an address of an originator of the transaction request from the transaction request and to send a response to the originator at the extracted address upon determining that the CICS is the intended endpoint of the transaction request, but otherwise to route the transaction request to a different CICS along with the address within the transaction request.

2. The CICS transaction routing system of claim 1, wherein the program code of the DRS routing module is further enabled to release allocated resources in the CICS subsequent either to routing the transaction request to the different CICS, or to sending the response to the originator.

3. The CICS transaction routing system of claim 1, wherein the CICS releases the allocated resources only upon receipt from the different CICS that the different CICS is an intended endpoint of the transaction request.

4. The CICS transaction routing system of claim 1, wherein the address is stored in an origin data field of the requests conforming to the IPIC protocol.

5. The CICS transaction routing system of claim 1, wherein the originator is a gateway daemon.

6. The CICS transaction routing system of claim 1, wherein the connector is a transaction gateway.

7. A computer program product for returning a response directly to a transaction request originator in a customer information control system (CICS), the computer program product comprising:
   a computer readable storage medium comprising a device having computer readable program code embodied therewith, the computer readable program code comprising:
   computer readable storage medium receiving a transaction request in a CICS;
   computer readable storage medium allocating resources in the CICS in response to receiving the transaction request;
   computer readable storage medium determining whether the CICS is an intended endpoint of the transaction request; and,
   computer readable storage medium extracting an address of an originator of the transaction request from the transaction request and sending a response to the originator at the extracted address upon determining that the CICS is the intended endpoint of the transaction request, but otherwise routing the transaction request to a different CICS along with the address within the transaction request.

8. The computer program product of claim 7, further comprising computer readable storage medium releasing allocated resources in the CICS subsequent either to routing the transaction request to the different CICS, or to sending the response to the originator.

9. The computer program product of claim 7, wherein the CICS releases the allocated resources only upon receipt from the different CICS that the different CICS is an intended endpoint of the transaction request.

10. The computer program product of claim 7, wherein the address is stored in an origin data field of the requests conforming to the IPIC protocol.

11. The computer program product of claim 7, wherein the originator is a gateway daemon.

* * * * *